United States Patent
Hamrick et al.

(10) Patent No.: US 11,648,828 B2
(45) Date of Patent: May 16, 2023

(54) RETROFIT REAR CURBSIDE DOOR FOR VEHICLE

(71) Applicants: Leonard M. Hamrick, Doylestown, OH (US); Dennis W. Summers, Wadsworth, OH (US); Mark Joseph Minatel, Brecksville, OH (US)

(72) Inventors: Leonard M. Hamrick, Doylestown, OH (US); Dennis W. Summers, Wadsworth, OH (US); Mark Joseph Minatel, Brecksville, OH (US)

(73) Assignee: Driverge Vehicle Innovations, LLC, Richfield, OH (US)

( * ) Notice: Subject to any disclaimer, the term of this patent is extended or adjusted under 35 U.S.C. 154(b) by 366 days.

(21) Appl. No.: 17/038,815

(22) Filed: Sep. 30, 2020

(65) Prior Publication Data

US 2021/0094395 A1    Apr. 1, 2021

Related U.S. Application Data

(60) Provisional application No. 62/907,779, filed on Sep. 30, 2019.

(51) Int. Cl.
  *B60J 5/04* (2006.01)
  *B60J 5/10* (2006.01)

(52) U.S. Cl.
  CPC ........... *B60J 5/0469* (2013.01); *B60J 5/0412* (2013.01); *B60J 5/107* (2013.01); *B60J 5/0497* (2013.01); *B60J 5/108* (2013.01)

(58) Field of Classification Search
  CPC ........ B60J 5/107; B60J 5/0469; B60J 5/0497; B60J 5/108
  See application file for complete search history.

(56) References Cited

U.S. PATENT DOCUMENTS

| | | | |
|---|---|---|---|
| 3,905,638 A | 9/1975 | Persico |
| 3,907,357 A | 9/1975 | Davis, Jr. |
| 6,554,348 B1 | 4/2003 | Gemstein |
| 6,669,266 B1 | 12/2003 | Pugh et al. |
| 8,567,126 B2 | 10/2013 | Hozumi et al. |
| 9,074,398 B2 | 7/2015 | Maruyama et al. |

(Continued)

FOREIGN PATENT DOCUMENTS

| | | |
|---|---|---|
| FR | 2974837 A1 | 11/2012 |
| KR | 200472157 Y1 | 4/2014 |
| RU | 166120 U1 | 11/2016 |

*Primary Examiner* — Joseph D. Pape
(74) *Attorney, Agent, or Firm* — Ulmer & Berne LLP (57) ABSTRACT

A rear curbside door assembly includes a door frame, a door, and a support member. The door frame includes first and second side frame members, an upper frame member and at least one stair. The second side frame member is spaced from the first side frame member and is configured for releasable attachment to a D-pillar of a body of a vehicle. The upper frame member extends between the first and second side frame members. The at least one stair extends between the first and second side frame members and is spaced from the upper frame member. The door is pivotally coupled with the door frame. The support member is configured for releasable attachment to a body of a vehicle. The support member is releasably attached to the first side frame member. A vehicle including a rear curbside door assembly and methods thereof are also provided.

20 Claims, 10 Drawing Sheets

(56) References Cited

U.S. PATENT DOCUMENTS

| | | |
|---|---|---|
| 9,393,910 B2 | 7/2016 | Ronsen |
| 9,452,703 B2 | 9/2016 | Weiner et al. |
| 11,485,204 B2 * | 11/2022 | Ramsey ................... B60J 5/08 |
| 2015/0069782 A1 | 3/2015 | Potts et al. |
| 2016/0082815 A1 | 3/2016 | Lee et al. |
| 2016/0129764 A1 * | 5/2016 | Beaupre ................ B62D 65/06 |
| | | 156/99 |

* cited by examiner

RETROFIT REAR CURBSIDE DOOR FOR VEHICLE

REFERENCE TO RELATED APPLICATION

This application claims priority of U.S. provisional patent application Ser. No. 62/907,779, entitled Retrofit Curbside Door for Vehicle, filed Sep. 30, 2019, and hereby incorporates this provisional patent application by reference herein in its entirety.

TECHNICAL FIELD

The apparatuses and methods described below relate to a retrofit curbside door for a vehicle, such as a transit van or a small bus. The retrofit curbside door is provided rearward of a rear axle of the vehicle.

BACKGROUND

Conventional OEM transit vehicles or OEM small busses do not have a curbside door that is positioned rearward of the rear axle that allows a passenger access to a rear area of a rear passenger compartment.

BRIEF DESCRIPTION OF THE DRAWINGS

The following detailed description of embodiments can be best understood when read in conjunction with the drawings enclosed herewith.

DETAILED DESCRIPTION

Figure 1:
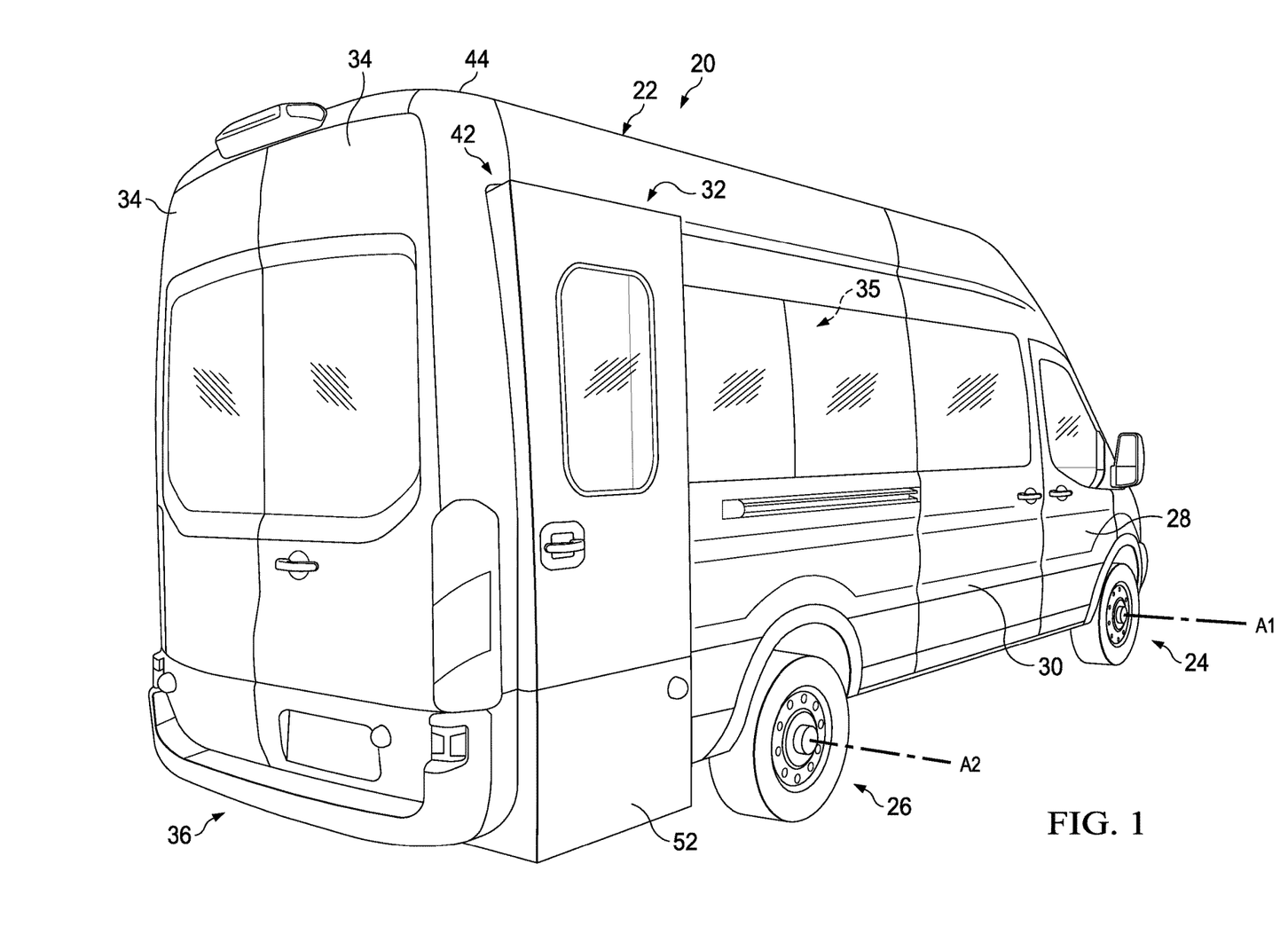
FIG. 1 is a rear isometric view depicting a vehicle that includes a body and a rear curbside door assembly retrofit thereon.

Embodiments are hereinafter described in detail in connection with the views and examples of FIGS. 1-10. A vehicle 20 is generally depicted in FIG. 1 and is shown to include a body 22, a pair of front wheels 24 (one shown), and a pair of rear wheels 26 (one shown) located rearwardly of the front wheels 24. The front wheels 24 and the rear wheels 26 can be rotatably coupled with the body 22 and rotatable about front and rear axes A1, A2, respectively. The vehicle 20 can also include a pair of front doors 28 (one shown), a central side door 30, a rear curbside door assembly 32, and a pair of rear doors 34. The central side door 30 can be disposed between one of the front doors 28 and the rear curbside door assembly 32. The central side door 30 can comprise a sliding door that is slidably coupled with the body 22 and is slidable between a closed position (FIG. 1) and an opened position (not shown) to provide access to a passenger compartment 35 of the vehicle 20. In one embodiment, a powered lift (not shown) can be selectively deployed from the central side door 30 to assist a passenger entering or exiting the vehicle 20 at the central side door 30. It is to be appreciated, that although the central side door 30 is illustrated as a sliding door, any of a variety of suitable alternative arrangements are contemplated, such as, for example, side-by-side hinged doors.

The rear curbside door assembly 32 can be provided rearwardly of the rear wheels 26 to provide passenger access along a right side (e.g., a curbside) of the vehicle 20 to a rear portion of the passenger compartment 35. In one embodiment, the rear curbside door assembly 32 can be disposed entirely rearwardly of the rear wheels 26 (e.g., entirely rearwardly of a vertical plane that intersects the axis A2). As will be described in further detail below, the rear curbside door assembly 32 can be retrofit onto the vehicle 20 in a manner that is otherwise not provided for by an OEM version of the vehicle 20 (e.g., the OEM version of the vehicle 20 that is delivered from the manufacturer's assembly line).

The rear doors 34 can be disposed at a rear end 36 of the vehicle 20 and rearwardly of the rear curbside door assembly 32. It is to be appreciated, that although the rear doors 34 are illustrated in FIG. 1 to comprise side-by-side hinged doors, any of a variety of suitable alternative arrangements are contemplated, such as, for example, a lift door. It is also to be appreciated that although the central side door 30 and the rear curbside door assembly 32 are shown to be disposed on a right side of the vehicle 20 to allow for curbside ingress/egress to/from the right side of the vehicle 20, a central side door (e.g., 30) and/or a rear curbside door assembly (e.g., 32) can additionally or alternatively be disposed on a left side of the vehicle 20.

Figure 2:
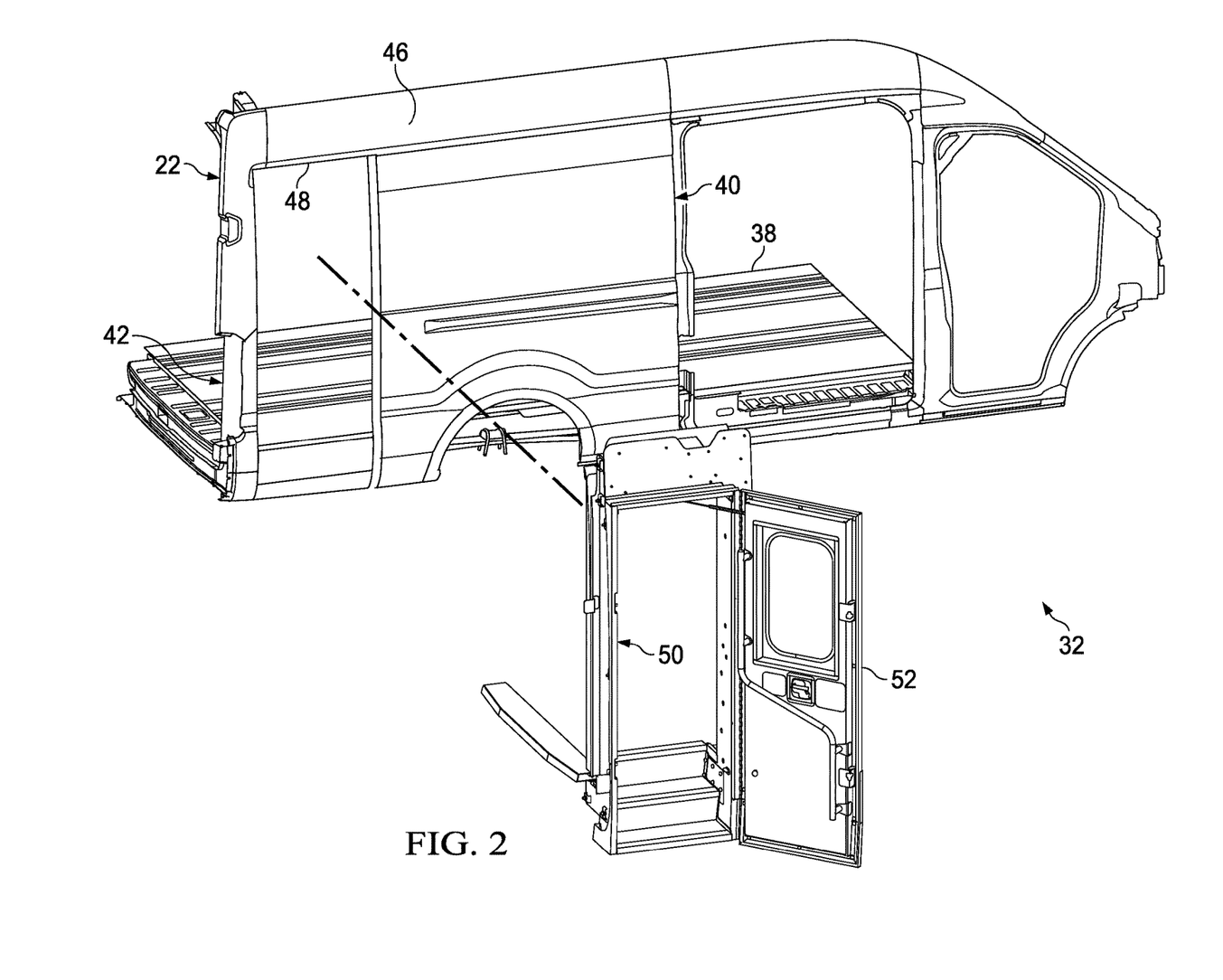
FIG. 2 is a partially exploded view of the vehicle of FIG. 1 with certain components of the body removed for clarity of illustration.

Referring now to FIG. 2, the body 22 can include a floor panel 38 and a side panel 40 that extends upwardly from the floor panel 38. The body 22 can also include a D-pillar 42 that extends substantially vertically from the floor panel 38 and provides structural support for the rear doors 34, the side panel 40, and a roof panel 44 (FIG. 1) relative to the floor panel 38 and the rest of the body 22. The D-pillar 42 can be positioned longitudinally rearwardly of the rear wheels 26 and can be the rearwardmost pillar on the vehicle 20.

The side panel 40 can include an outer skin 46 that defines an opening 48 that is disposed forwardly of the D-pillar 42. The rear curbside door assembly 32 can be at least partially disposed in the opening 48 and can be releasably coupled with the body 22 to facilitate retrofitting of the rear curbside door assembly 32 onto the vehicle 20, as will be described in further detail below. Typically, on an OEM vehicle platform provided from a manufacturer, the outer skin 46 extends substantially continuously between a C-pillar not shown and the D-pillar 42 and does not include the opening 48. In order to facilitate retrofitting of the rear curbside door assembly 32 onto the vehicle 20, the opening 48 must first be cut out of the side panel (e.g., 46) of the OEM version. In one embodiment, the opening 48 can be cut out of the outer skin 46 using a jig (not shown) or template that is representative of the overall profile of the rear curbside door assembly 32. The jig or template can be temporarily attached to the side panel 40 and a cutting device, such as a body saw or a cutting torch, can be routed around the jig or template to cut out the opening 48. Once the cutting of the opening 48 is complete, the jig or template can be removed.

Figure 3:
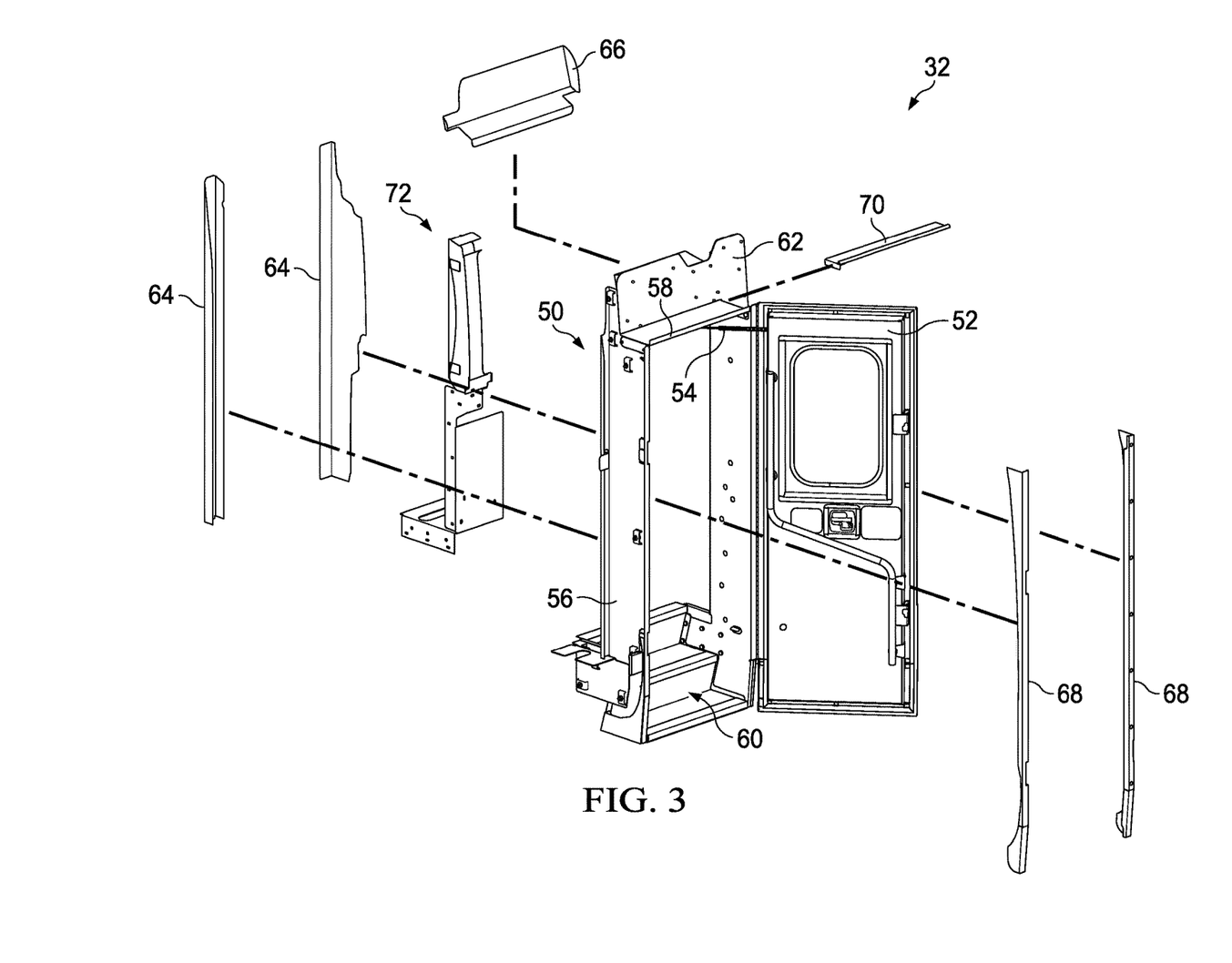
FIG. 3 is an exploded view of the rear curbside door assembly of FIG. 1.

Referring now to FIG. 3, the rear curbside door assembly 32 can include a door frame 50 and a door 52 pivotally coupled with the door frame 50. The door frame 50 can include a right side frame member 54, a left side frame member 56, an upper frame member 58, and a plurality of stairs 60. The right and left side frame members 54, 56 can be substantially vertical and can be spaced from each other. The upper frame member 58 can extend between the right and left frame members 54, 56. A header plate 62 can be coupled with the upper frame member 58 and configured for releasable coupling with the body 22. The stairs 60 can be spaced from the upper frame member 58 and can extend between the right and left frame members 54, 56. The stairs 60 can be configured to allow a user to step into and out of the passenger compartment 35. The door 52 is shown to be pivotally coupled to the right side frame member 54 such that the door 52 opens towards the front of the vehicle 20. However, the door 52 can alternatively be pivotally coupled with the left side frame member 56 such that the door 52 opens towards the rear of the vehicle 20. It is to be appreciated that although the door 52 is illustrated as a pivoting door, any of a variety of suitable alternative arrangements are contemplated, such as, for example, accordion doors or side-by-side hinged doors.

The rear curbside door assembly 32 can also include a pair of a side interior cover panels 64, an upper interior cover panel 66, a pair of side exterior cover panels 68, and an upper exterior cover panel 70. Each of the side interior cover panels 64 can overlie respective ones of the right and left frame members 54, 56 to effectively conceal the right and left frame members 54, 56 within the passenger compartment 35. The upper interior cover panel 66 can overlie the upper frame member 58 and the header plate 62 to effectively conceal the upper frame member 58 and the header plate 62 within the passenger compartment 35. Each of the side exterior cover panels 68 can overlie respective ones of the right and left frame members 54, 56 and the upper exterior cover panel 70 can overlie the upper frame member 58. The side exterior cover panels 68 can each be contoured to mate with the outer skin 46 (FIG. 2) such that they cooperate with the outer skin 46 to substantially conceal the right and left frame members 54, 56 and the outer edges of the opening 48 (FIG. 2). The side exterior cover panels 68 and the upper exterior cover panel 70 can cooperate to provide an aesthetically pleasing look to the vehicle 20 without requiring the use of caulk and/or body putty that is typically used in conventional retrofit door arrangements and can thus be a more cost effective and efficient solution. In one embodiment, the side interior cover panels 64, the upper interior cover panel 66, the side exterior cover panels 68, and the upper exterior cover panel 70 can be coupled to the door frame 50 with fasteners (not shown), but can additionally or alternatively be coupled to the door frame 50 using any of a variety of suitable alternative coupling arrangements, such as, internal tabs that interface with the door frame 50 in an interference fit.

Figure 4:
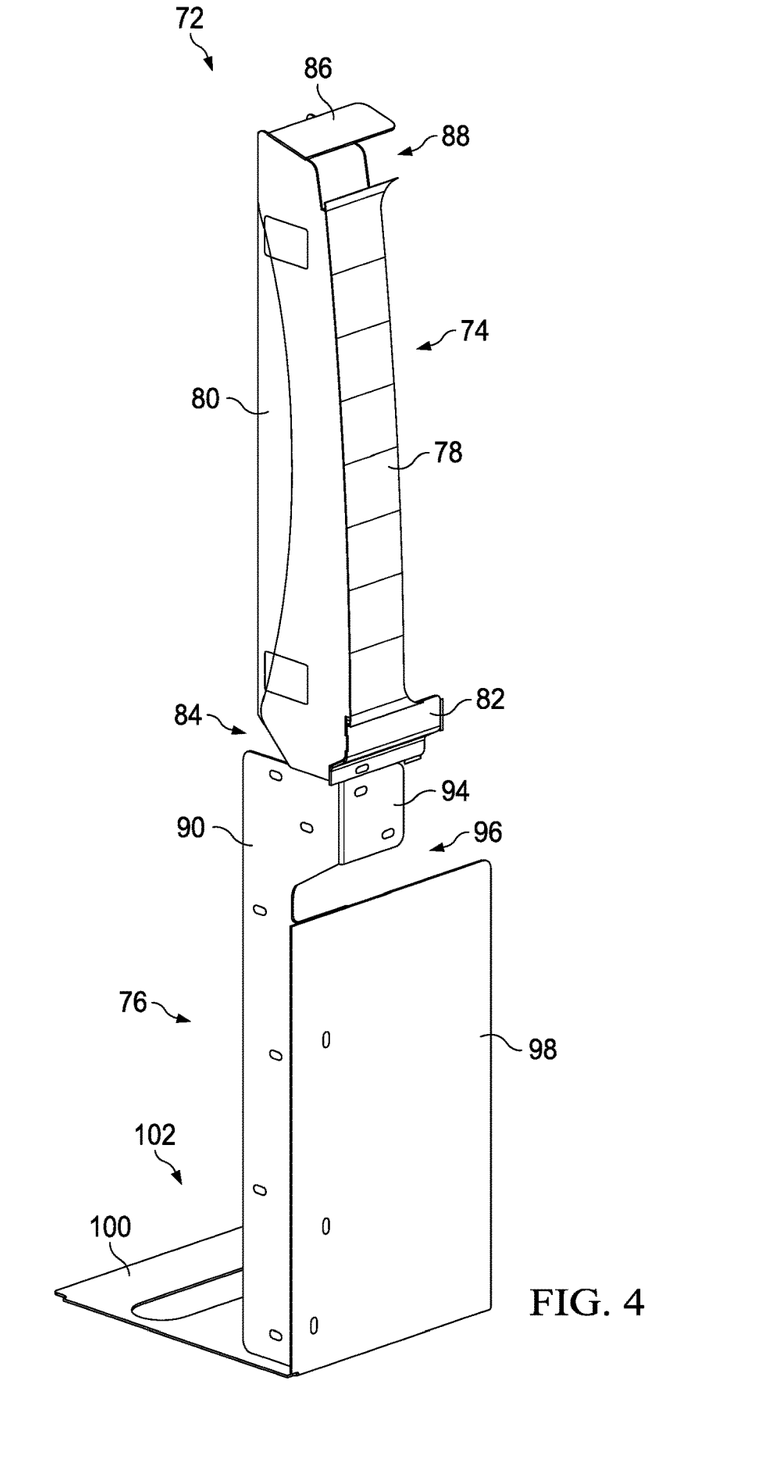
FIG. 4 is a front isometric view depicting a support member of the rear curbside door assembly of FIG. 1.
Figure 5:
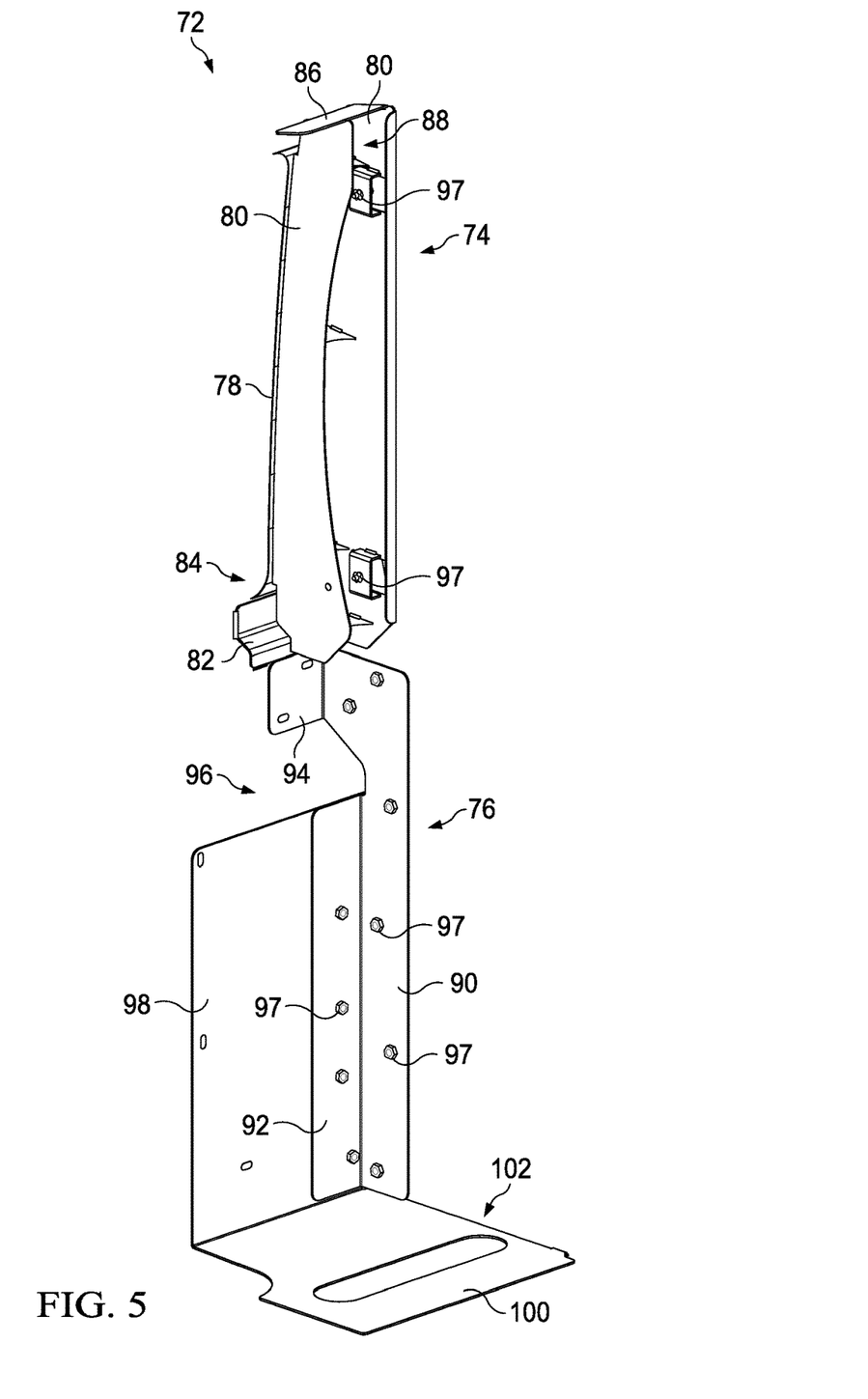
FIG. 5 is a rear isometric view of the support member of FIG. 5.

The rear curbside door assembly 32 can also include a support member 72 that is configured for releasable coupling to the body 22 and facilitates coupling of the door frame 50 to the body 22. Referring now to FIGS. 4 and 5, the support member 72 can include an upper structural member 74 and a lower structural member 76. The upper structural member 74 can include a main body 78 that includes a pair of elongate flanges 80 that are spaced from each other. The main body 78 can also include a lower securement tab 82 extending from a proximal end 84 and an upper securement tab 86 extending from a distal end 88. The lower structural member 76 can include a side flange 90, a lower front flange 92, and an upper front flange 94. The lower front flange 92 and the upper front flange 94 can extend from the side flange 90 at substantially a right angle, such that the lower structural member 76 is substantially L-shaped. The upper front flange 94 can be disposed at a proximal end 96. The support member 72 can include a plurality of blind nuts 97 (FIG. 5) that facilitate attachment of the door frame 50 to the support member 72 as will be described in further detail below. A front plate 98 can be disposed on the lower front flange 92 and a structural plate 100 can be disposed at a distal end 102 of the lower structural member 76. The front plate 98 and the structural plate 100 can be coupled with the lower front flange 92 by releasable fasteners (not shown).

Figure 6:
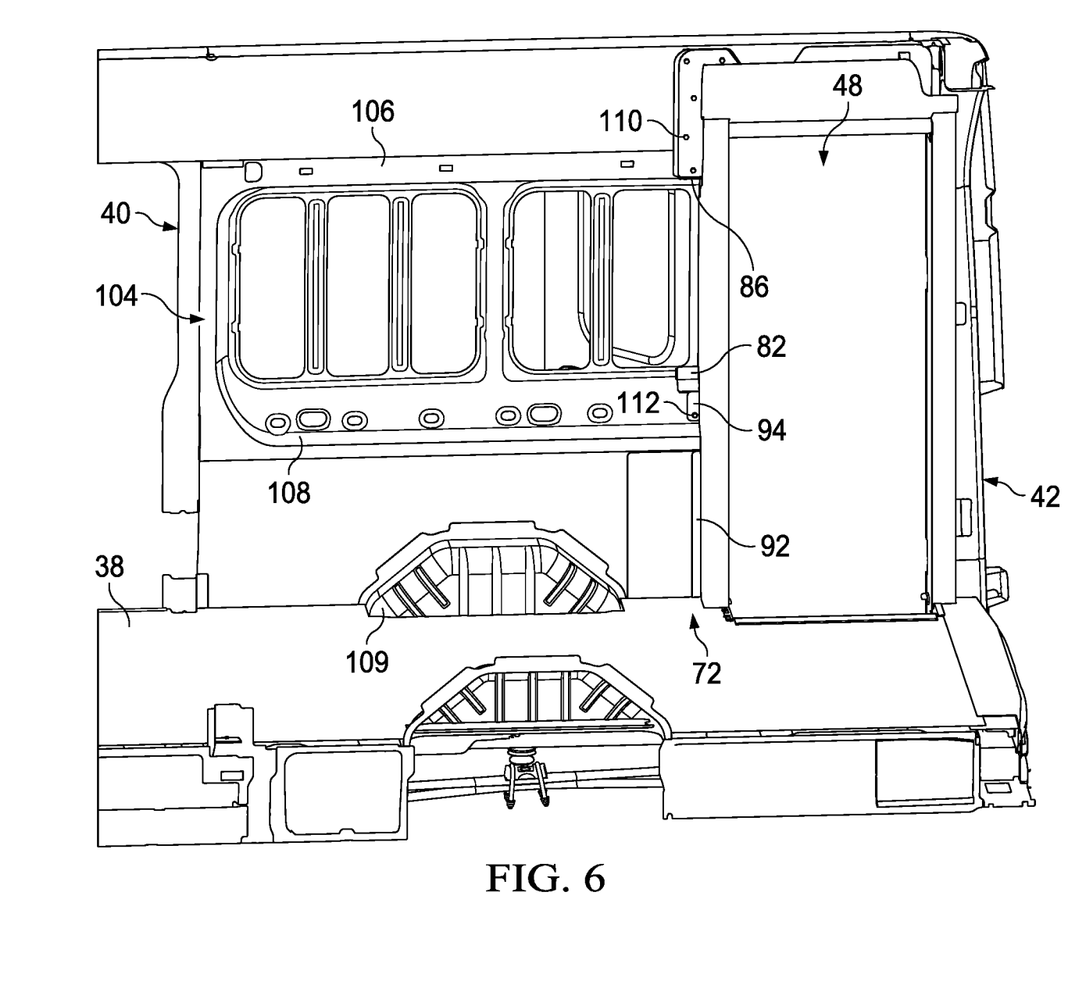
FIG. 6 is an enlarged right side view of the vehicle of FIG. 1 with certain components of the body and the rear curbside door assembly removed for clarity of illustration.

Referring now to FIG. 6, the side panel 40 can include an interior structure 104 that underlies the outer skin 46. The interior structure 104 is part of the overall "body-in-white" structure of the vehicle 20 and can include a roof rail 106 and a rocker portion 108. The support member 72 can be disposed on an opposite side of the opening 48 as the D-pillar 42 such that the opening 48 is interposed between the D-pillar 42 and the support member 72. The body 22 can include a wheel well 109 that is disposed above one of the rear wheels 26. The support member 72 can be disposed rearwardly of the wheel well 109.

The support member 72 can be secured to the interior structure 104 and the floor panel 38 to provide a rigid member for attaching the door frame 50 to the body 22. In one embodiment, as illustrated in FIG. 6, the upper securement tab 86 of the support member 72 can be releasably attached to the roof rail 106 with threaded fasteners 110 and the lower securement tab 82, the lower front flange 92, and the upper front flange 94 can be releasably attached to the rocker portion 108 with threaded fasteners 112. Releasable attachment of the support member 72 to the interior structure 104 in this manner can allow for ease of installation of the support member 72 to the vehicle 20 during the retrofitting procedure with minimal or no welding, which can be time consuming and expensive. In one embodiment, structural adhesive (not shown) can be added between the support member 72 and the interior structure 104 to further enhance the securement of the support member 72 thereto.

Figure 7:
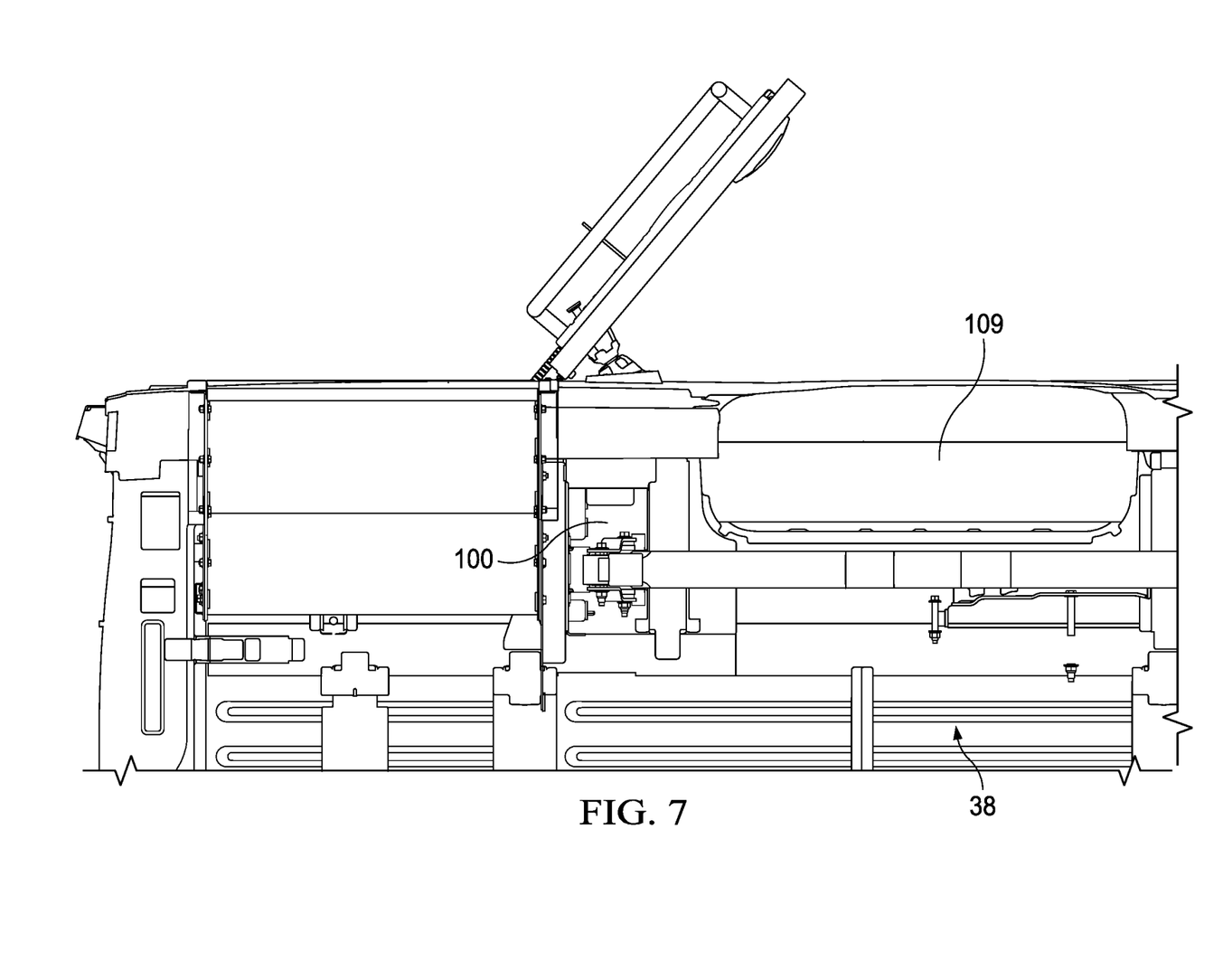
FIG. 7 is a lower plan view of the vehicle of FIG. 1.

Referring now to FIG. 7, the structural plate 100 can be provided beneath the floor panel 38 and coupled thereto to enhance the overall structural rigidity of the installation. In one embodiment, the structural plate 100 can be welded to the floor panel 38. However, the structural plate 100 can be attached to the floor panel 38 using any of a variety of securement methods, such as, for example, fasteners and/or structural adhesive. Releasable attachment of the support member 72 described above, together with the attachment of the structural plate 100 to the floor panel 38, can retain the overall structural integrity of the body-in-white structure that may have otherwise been compromised as a result of cutting the opening 48 in the side panel 40. In fact, a finite element analysis test was performed on the OEM version of the vehicle 20 and on the altered version of the vehicle 20 (e.g., after the opening 48 was cut into the side panel 40 and the support member 72 was installed) and showed no significant difference in the transmission of load through the body 22 between the OEM version and the altered version of the vehicle 20.

Figure 8:
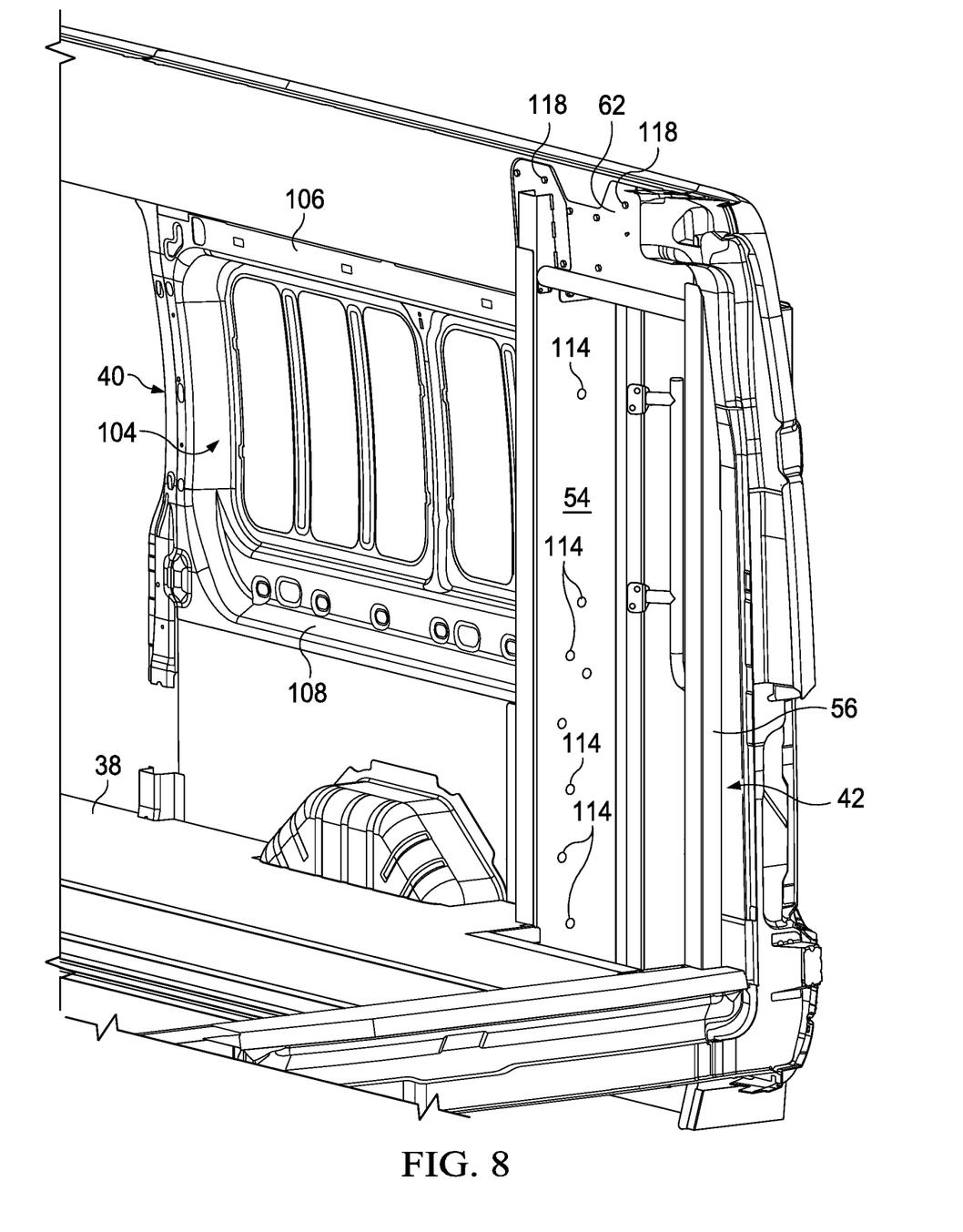
FIG. 8 is a rear isometric view of the vehicle of FIG. 1 with certain components of the body and the rear curbside door assembly removed for clarity of illustration.
Figure 9:
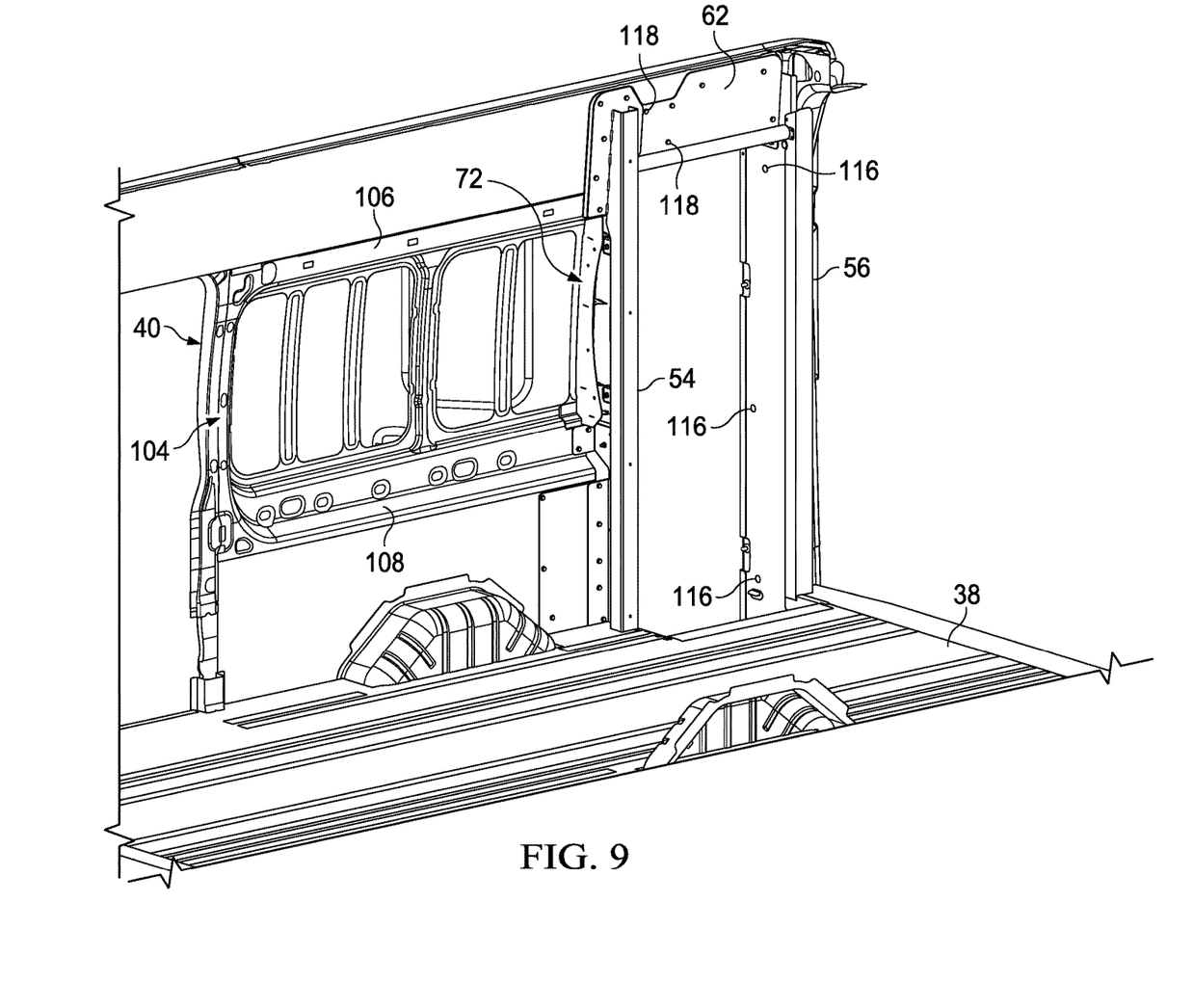
FIG. 9 is a front isometric view of the vehicle of FIG. 1 with certain components of the body and the rear curbside door assembly removed for clarity of illustration.
Figure 10:
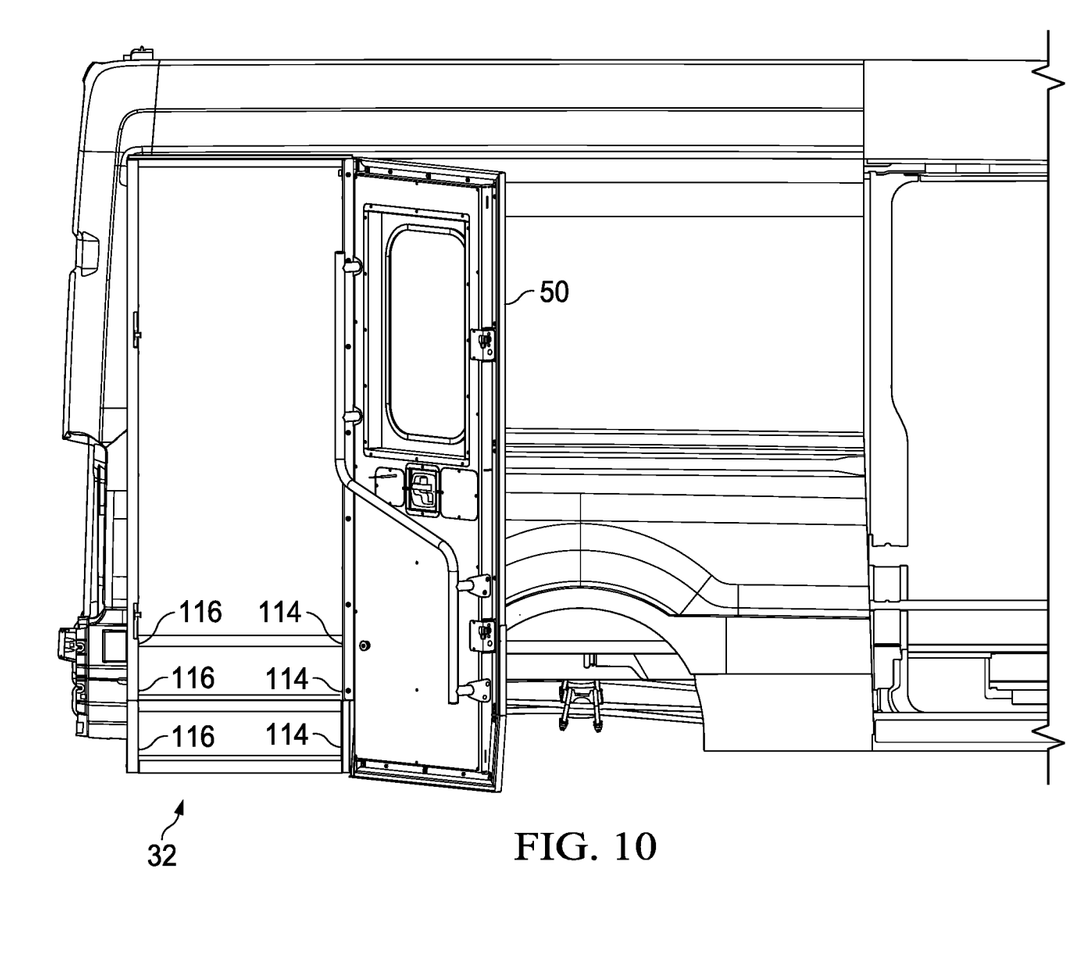
FIG. 10 is a right side view of the vehicle of FIG. 1 with certain components removed for clarity of illustration.

Referring now to FIGS. 8-10, the rear curbside door assembly 32 is shown installed on the vehicle 20. As illustrated in FIG. 8, the right side frame member 54 can be releasably attached to the support member 72 with threaded fasteners 114 that are threaded into the blind nuts 97 (FIG. 4). As illustrated in FIG. 9, the left side frame member 56 can be releasably attached to the D-pillar 42 with threaded fasteners 116. In one embodiment, the location of the threaded fasteners 116 can correspond with threaded holes in the D-pillar 42 that already exist on the OEM chassis and are capable of structurally supporting the rear curbside door assembly 32. In another embodiment, threaded nuts (e.g., blind nuts) (not shown) can be added to the D-pillar 42 for receiving the threaded fasteners 116. As illustrated in FIG. 10, certain ones of the threaded fasteners 114, 116 can be provided adjacent to the stairs 60 to enhance the support of the stairs 60 relative to the support member 72 and the D-pillar 42. As illustrated in FIGS. 8 and 9, the header plate 62 can be attached to the roof rail 106 of the interior structure 104 with threaded fasteners 118. Releasable attachment of the door frame 50 to the body 22 and the support member 72 in this manner can provide a door assembly that is as sturdy as, or even sturdier than, conventional arrangements but with minimal or no welding, which can be time consuming and expensive.

One example of a retrofitting procedure of the rear curbside door assembly 32 to the body 22 of the vehicle 20 will now be described. First an OEM version of the vehicle 20 can be received from the manufacturer. A jig can be attached to the side panel 40 at a desired location for the rear curbside door assembly 32. A cutting tool can be routed around the jig to cut out the opening 48 in the side panel 40 and the jig can be removed. The door frame 50 of the rear curbside door assembly 32 can then be assembled. The support member 72 can be installed on the interior structure 104 in front of the opening 48 and the structural plate 100 can be attached to the floor panel 38. In one embodiment, structural adhesive can be added between the support member 72 and the interior structure 104 to further enhance the structural rigidity therebetween. The door frame 50 can be inserted into the opening 48 and the right and left side frame members 54, 56 can be attached to the support member 72 and the D-pillar 42 with the threaded fasteners 114, 116, respectively. The header plate 62 can also be attached to the roof rail 106 of the interior structure 104 with the threaded fasteners 118. The door 52 can then be hung on the door frame 50 and the various cover panels 64, 66, 68, 70 can be installed. It is to be appreciated that installation of the rear curbside door assembly 32 in this manner can be more efficient, less expensive, and less physically demanding than conventional retrofit vehicle doors.

It is to be appreciated that, although the body 22 is shown to be a unibody construction, in other embodiments, a body can be provided in any of a variety of other suitable arrangements, such as an underlying frame having a tubular construction, for example, and can be formed using any of a variety of materials, such as steel, aluminum, or carbon fiber, for example. It is also to be appreciated that although the rear curbside door assembly 32 is shown to be retrofit onto a Ford Transit Cargo Van (Model W3X), the rear curbside door assembly 32 can be retrofit onto any of a variety of suitable alternative vehicles in accordance with the principles described herein. It is further to be appreciated that although the rear curbside door assembly 32 is shown to be provided on a right side of the vehicle 20, a rear curbside door assembly can be additionally or alternatively provided on a left side of the vehicle 20.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A rear curbside door assembly for retrofitting onto a vehicle, the door assembly comprising:
    a door frame comprising:
        a first side frame member;
        a second side frame member spaced from the first side frame member and configured for releasable attachment to a D-pillar of a body of a vehicle;
        an upper frame member extending between the first side frame member and the second side frame member; and
        at least one stair extending between the first side frame member and the second side frame member and spaced from the upper frame member;
    a door pivotally coupled with the door frame; and
    a support member configured for releasable attachment to a body of a vehicle, the support member being releasably attached to the first side frame member.

2. The rear curbside door assembly of claim 1 wherein the support member further comprises an upper structural member and a lower structural member.

3. The rear curbside door assembly of claim 1 further comprising a fastener that facilitates releasable attachment of the second side frame member to the support member.

4. The rear curbside door assembly of claim 3 wherein the support member comprises a blind nut and the fastener is threadably coupled with the blind nut.

5. The rear curbside door assembly of claim 1 further comprising:
    a first cover panel that overlies the first side frame member and is contoured to mate with an outer skin of a vehicle to substantially entirely conceal the first side frame member; and
    a second cover panel that overlies the second side frame member and is contoured to mate with an outer skin of a vehicle to substantially conceal the second side frame member.

6. The rear curbside door assembly of claim 1 further comprising a header plate coupled with the upper frame member and configured for releasable attachment with a body of a vehicle.

7. A vehicle comprising:
    a body comprising a side panel, a floor panel, and a D-pillar, the side panel defining an opening that is disposed forwardly of the D-pillar;
    a pair of front wheels rotatably coupled with the body;
    a pair of rear wheels provided rearwardly of the pair of front wheels and rotatably coupled with the body such that the pair of rear wheels are rotatable about an axis, wherein the D-pillar and the opening are positioned rearwardly of the axis; and a rear curbside door assembly at least partially disposed in the opening, the rear door assembly comprising:
- a support member releasably attached to the body and disposed on an opposite side of the opening as the D-pillar;
- a door frame comprising:
  - a first side frame member releasably attached to the support member;
  - a second side frame member spaced from the first side frame member and releasably attached to the D-pillar;
  - an upper frame member extending between the first side frame member and the second side frame member; and
  - at least one stair extending between the first side frame member and the second side frame member and spaced from the upper frame member; and
- a door pivotally coupled with the door frame.

8. The vehicle of claim 7 wherein the side panel comprises an outer skin and an interior structure and underlies the outer skin.

9. The vehicle of claim 8 wherein the support member is releasably attached with the interior structure.

10. The vehicle of claim 8 wherein the outer skin defines the opening.

11. The vehicle of claim 8 further comprising:
- a first cover panel that overlies the first side frame member and is contoured to mate with the outer skin to substantially entirely conceal the first side frame member; and
- a second cover panel that overlies the second side frame member and is contoured to mate with the outer skin to substantially entirely conceal the second side frame member.

12. The vehicle of claim 7 wherein the body further comprise a wheel well disposed above one of the rear wheels and the support member is disposed rearwardly of the wheel well.

13. The vehicle of claim 7 wherein the support member further comprises an upper structural member and a lower structural member.

14. The vehicle of claim 7 further comprising a fastener that facilitates releasable attachment of the second side frame member to the support member.

15. The vehicle of claim 14 wherein the support member comprises a blind nut and the fastener is threadably coupled with the blind nut.

16. The vehicle of claim 7 wherein the rear curbside door assembly further comprises a header plate coupled with the upper frame member and releasably attached with the body.

17. A method for retrofitting a rear curbside door assembly to a vehicle, the vehicle comprising a body, a pair of front wheels rotatably coupled with the body, and a pair of rear wheels rotatably coupled with the body, the method comprising:
- cutting an opening in a side panel of the vehicle rearwardly of the pair of rear wheels and forwardly of a D-pillar;
- releasably attaching a support member to the body with fasteners on an opposite side of the opening as the D-pillar and rearwardly of the rear wheels;
- releasably attaching a door frame of the rear curbside door assembly to each of the support member and the D-pillar with fasteners.

18. The method of claim 17 wherein releasably attaching the support member to the body comprises attaching the support member to an interior structure of a side panel of the body and to a floor panel.

19. The method of claim 18 wherein releasably attaching a door frame of the rear curbside door assembly to each of the support member and the D-pillar comprises releasably attaching a first frame member of the door frame to the D-pillar and a second frame member of the door frame to the support member, and wherein the method further comprises releasably attaching a header plate of the door assembly to the side panel.

20. The method of claim 17 further comprising:
- attaching a first cover panel to the first side frame member such that the first cover member overlies the first side frame member, the first cover member being contoured to mate with an outer skin of a side panel of the body to substantially conceal the first side frame member; and
- attaching a second cover panel to the second side frame member such that the second cover member overlies the second side frame member, the second cover member being contoured to mate with the outer skin to substantially conceal the second side frame member.

* * * * *